(12) United States Patent
Fujii

(10) Patent No.: US 9,319,562 B2
(45) Date of Patent: Apr. 19, 2016

(54) IMAGE FORMING APPARATUS CAPABLE OF SYCHRONIZING PERSONAL SETTING INFORMATION

(71) Applicant: CANON KABUSHIKI KAISHA, Tokyo (JP)

(72) Inventor: Manabu Fujii, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/605,281

(22) Filed: Jan. 26, 2015

(65) Prior Publication Data

US 2015/0229809 A1 Aug. 13, 2015

(30) Foreign Application Priority Data

Feb. 13, 2014 (JP) ................. 2014-025926

(51) Int. Cl.
| *G06F 15/00* | (2006.01) |
| *G06K 1/00* | (2006.01) |
| *G06K 15/00* | (2006.01) |
| *H04N 1/44* | (2006.01) |
| *H04N 1/32* | (2006.01) |
| *H04N 1/00* | (2006.01) |

(52) U.S. Cl.
CPC ......... *H04N 1/4406* (2013.01); *H04N 1/00204* (2013.01); *H04N 1/00244* (2013.01); *H04N 1/32101* (2013.01); *H04N 2201/001* (2013.01); *H04N 2201/0039* (2013.01); *H04N 2201/0094* (2013.01); *H04N 2201/3204* (2013.01)

(58) Field of Classification Search
USPC .................................... 358/1.1–1.18
See application file for complete search history.

(56) References Cited

U.S. PATENT DOCUMENTS

| 8,248,630 B2 * | 8/2012 | Fukuda ........................ 358/1.14 |
| 8,930,368 B2 | 1/2015 | Furuichi et al. |
| 2004/0243422 A1 * | 12/2004 | Weber et al. ..................... 705/1 |
| 2012/0166442 A1 | 6/2012 | Furuichi et al. |
| 2013/0204996 A1 | 8/2013 | Takazawa |
| 2015/0052539 A1 | 2/2015 | Yamamoto et al. |

FOREIGN PATENT DOCUMENTS

| JP | 2012-137973 A | 7/2012 |
| JP | 2013-161166 A | 8/2013 |
| JP | 2013-250896 A | 12/2013 |
| WO | 2013/027248 A1 | 2/2013 |

OTHER PUBLICATIONS

Hiroki Sato, "Setting Up Free BSD Building a secure server No. 7 Setting up printer sharing and building a PDC," UNIX User, vol. 12, No. 1, Softbank Publishing Co., Ltd., Japan, Jan. 1, 2013, pp. 2-4.

* cited by examiner

*Primary Examiner* — Douglas Tran
(74) *Attorney, Agent, or Firm* — Fitzpatrick, Cella, Harper & Scinto

(57) ABSTRACT

Permission of an extension program is checked, the data of an extension program having authority is distinguished from the data of an extension program having no authority, and only the data of the extension program having authority is synchronized, thereby ensuring the performance and security.

9 Claims, 15 Drawing Sheets

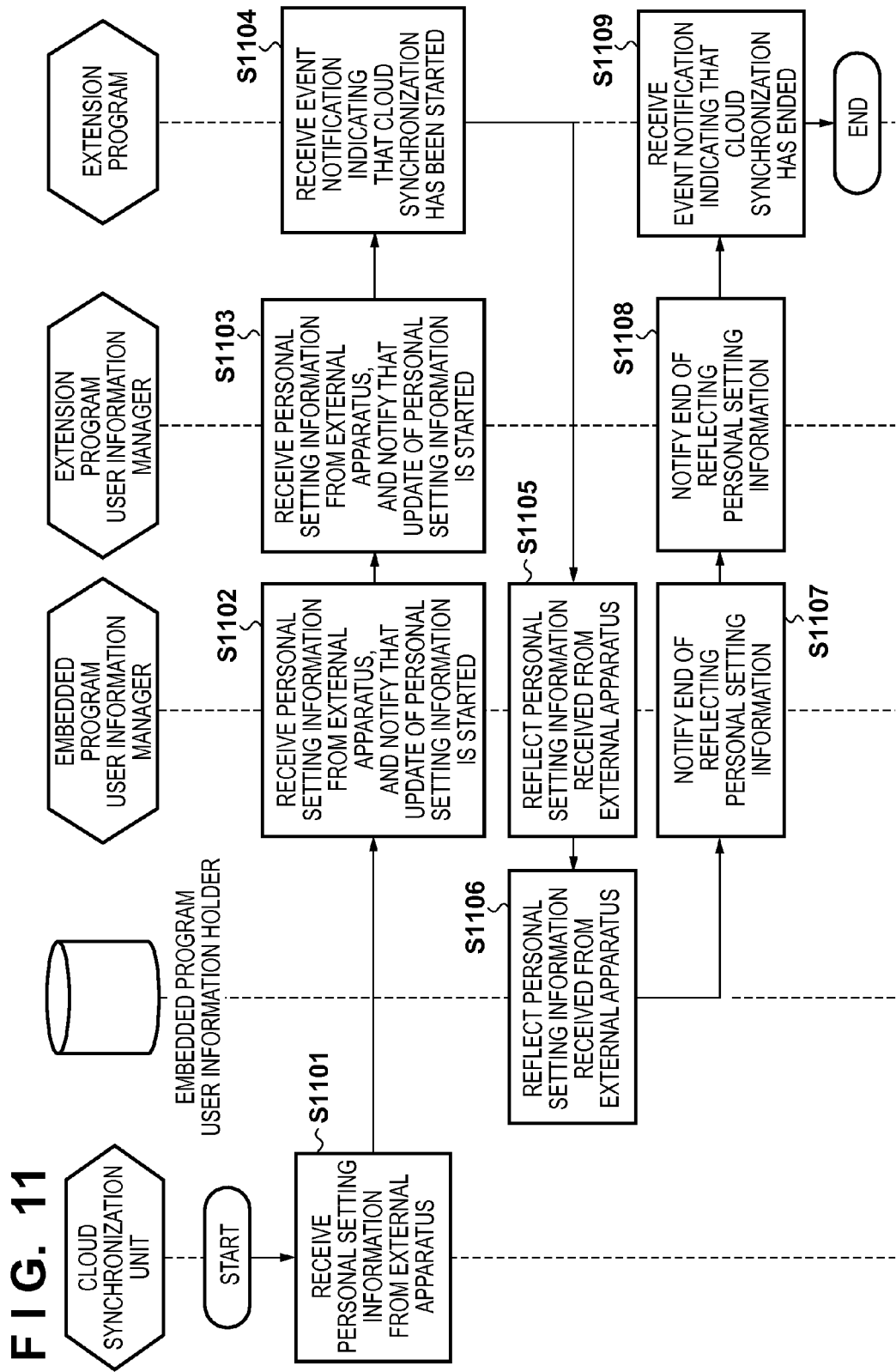

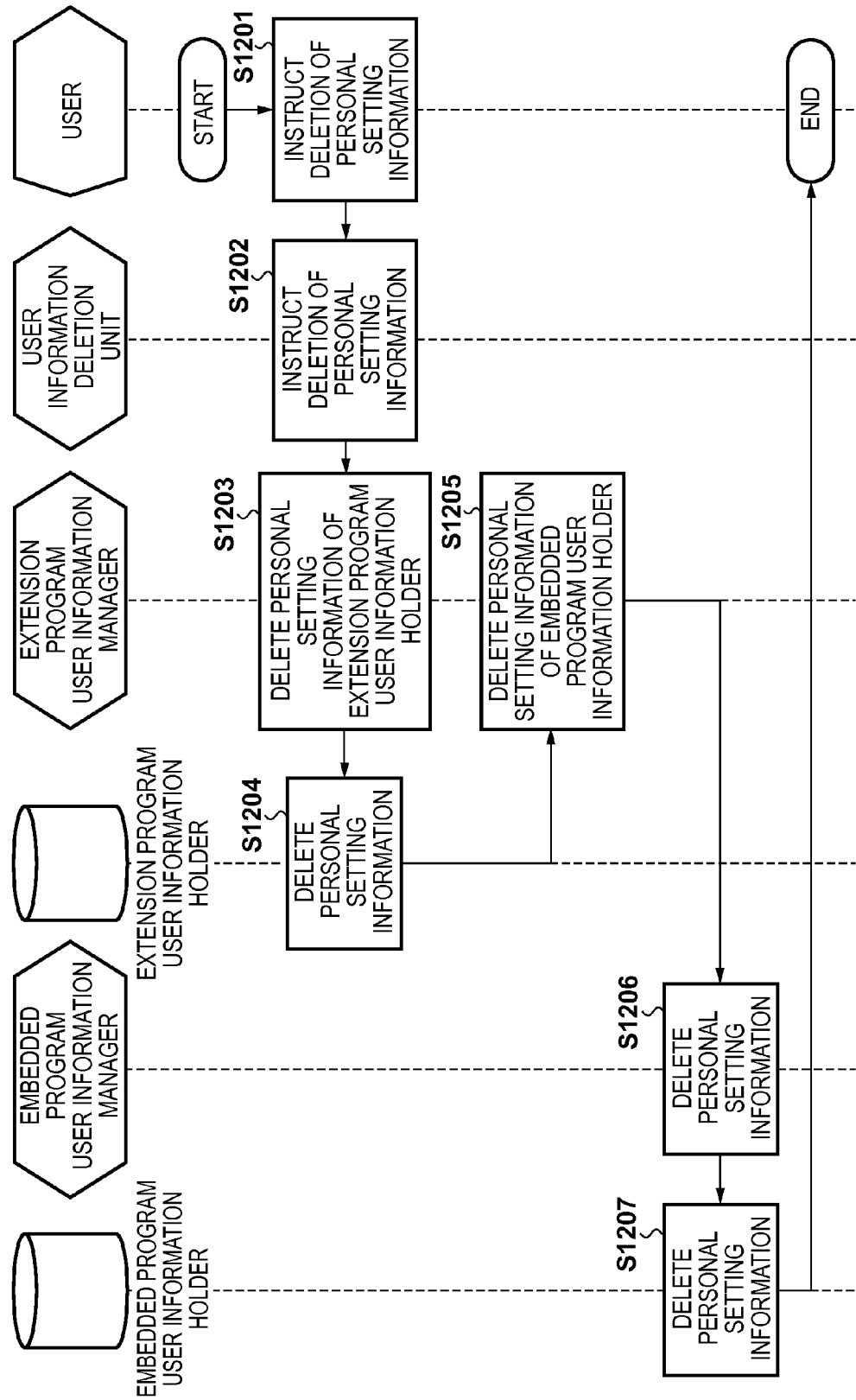

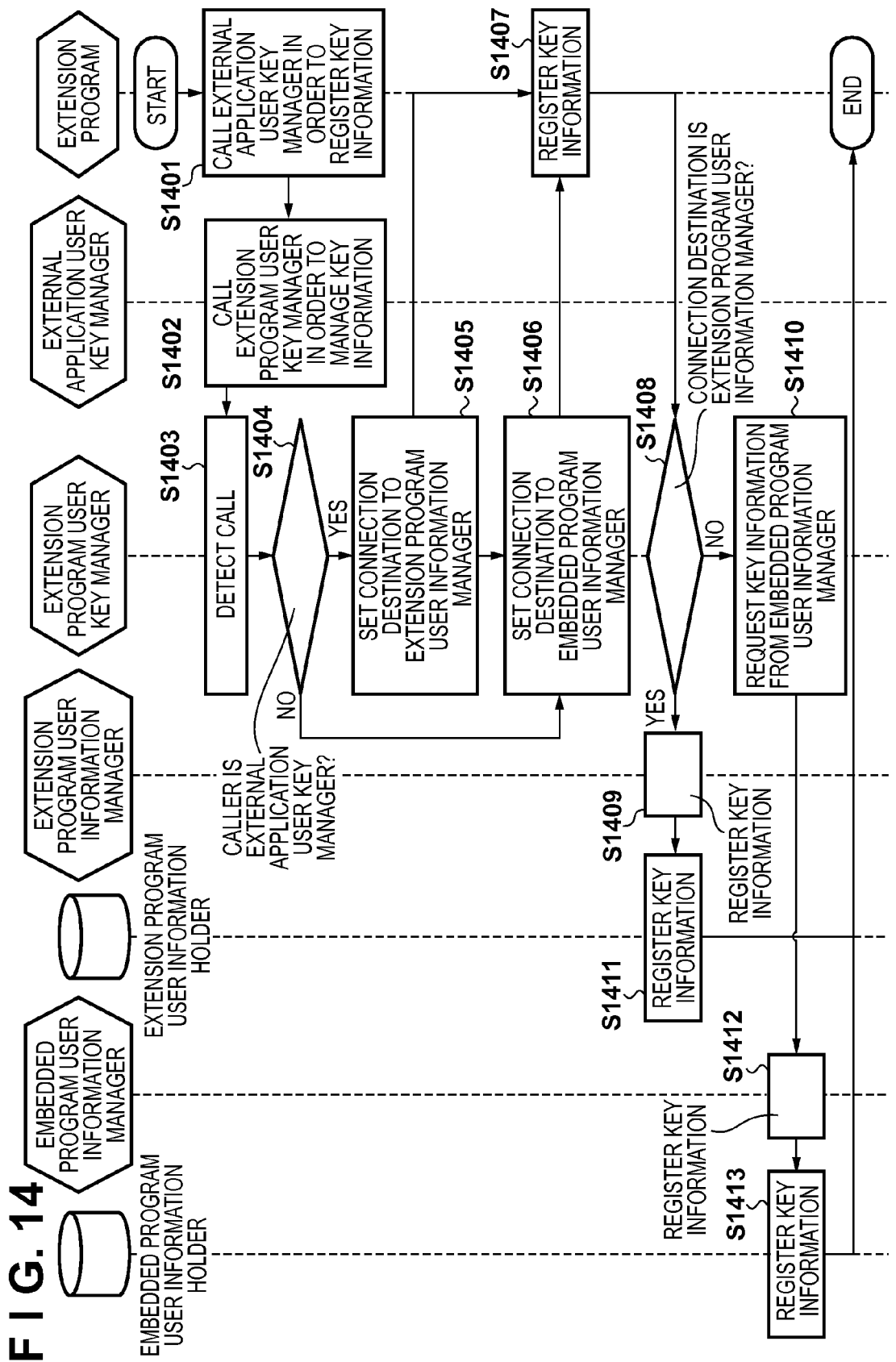

F I G. 15

```
(org.osgi.framework.AdminPermission " * " "metadata")
(com.Xxx.yyyPermission "zzz" "read, write")
(java.lang.RuntimePermission "stopThread")
(java.util.PropertyPermission "java.version" "read")
                    :
                    :
                    :
```

IMAGE FORMING APPARATUS CAPABLE OF SYCHRONIZING PERSONAL SETTING INFORMATION

BACKGROUND OF THE INVENTION

1. Field of the Invention

The present invention relates to an image forming apparatus capable of synchronizing, for example, personal setting information or the like with an external apparatus, and a control method of the image forming apparatus.

2. Description of the Related Art

With the recent widespread use of cloud computing, image forming apparatuses have also incorporated mechanisms that enable management of personal setting information and setting information of devices on the cloud, and sharing of such information among image forming apparatuses. For example, data of the address book for each user can be managed on the cloud, and can be shared among image forming apparatuses. Meanwhile, for image forming apparatuses, an extension program such as a Java (registered trademark) application can be subsequently installed. While the cloud-based data linkage as described above is widely used for functions that have been previously embedded in the image forming apparatuses, the user convenience will be further increased if the cloud-based data linkage is made possible for the personal setting information and the like that are handled by such a subsequently installed program.

However, the development kits for such subsequently installed extension programs are often released to third parties, and contain applications developed by vendors other than those developed by one's own company. If the cloud-based data linkage is applied to the personal setting information handled by an application developed by the third party without any restriction, it will be difficult to control the data size of the personal setting information and the performance during synchronization. In addition, security concerns arise depending on the content of the personal setting information. Furthermore, embedded programs also enable the cloud-based data linkage to be applied to the set values and the like of devices, in addition to the personal setting information. However, an access to the setting of a device by a third party program directly affects the operation of the device, thus posing security problems. Accordingly, when the data of a subsequently installed program is synchronized on the cloud, it is necessary to distinguish at least between the data handled by a third party extension program and the data handled by a company's own extension program created by the vendor of the image forming apparatus before considering the synchronization method.

As a known technique, a method of analyzing the content of data and categorizing the data has been proposed. Examples thereof include a method in which the content of documents is analyzed, and those with high confidentiality are categorized. However, the known technique is problematic in that it takes a considerable amount of time to perform analysis processing, leading to a reduction in usability. In order to solve the above-described problem, Japanese Patent Laid-Open No. 2012-137973 proposes a method in which the speed of data categorization is increased by performing categorization in multiple stages.

However, even though the method described in Japanese Patent Laid-Open No. 2012-137973 can increase the speed of data categorization aimed at controlling the user access, the patent document does not disclose how to synchronize the categorized data with the data on the cloud. Therefore, a problem to be solved is to provide how to categorize data in a form suitable for cloud synchronization.

SUMMARY OF THE INVENTION

The present invention provides an image forming apparatus that solves the above-described problem and has achieved sharing of data used by an extension program provided by a third party, while ensuring the data security for the extension program, and a control method thereof. The invention also provides an image forming apparatus that has achieved sharing of data used by the extension program, while maintaining good operability, in addition to ensuring security, and a control method thereof.

According to an aspect of the present invention, there is provide an image forming apparatus including a platform in which an application that accesses personal setting information can be installed, comprising: a first saving unit that saves first personal setting information; a second saving unit that saves second personal setting information; and a synchronization unit that synchronizes the first personal setting information of the first personal setting information and the second personal setting information with personal setting information held by an external apparatus.

According to the present invention, it is possible to distinguish between the data handled by a third party program and the data handled by a company's own program also for a subsequently installed program in the same manner as for the embedded function, and achieve cloud synchronization appropriately taking security and the data size into consideration.

Further features of the present invention will become apparent from the following description of exemplary embodiments with reference to the attached drawings.

BRIEF DESCRIPTION OF THE DRAWINGS

FIG. 11 is a flowchart of the procedure for performing an event notification indicating data update in Embodiment 2.

FIG. 12 is a flowchart of the procedure for deleting personal setting information in Embodiment 3.

FIG. 14 is a flowchart of the procedure for registering password information in Embodiment 4.

FIG. 15 shows an exemplary permission file of the extension program.

DESCRIPTION OF THE EMBODIMENTS

Figure 1:
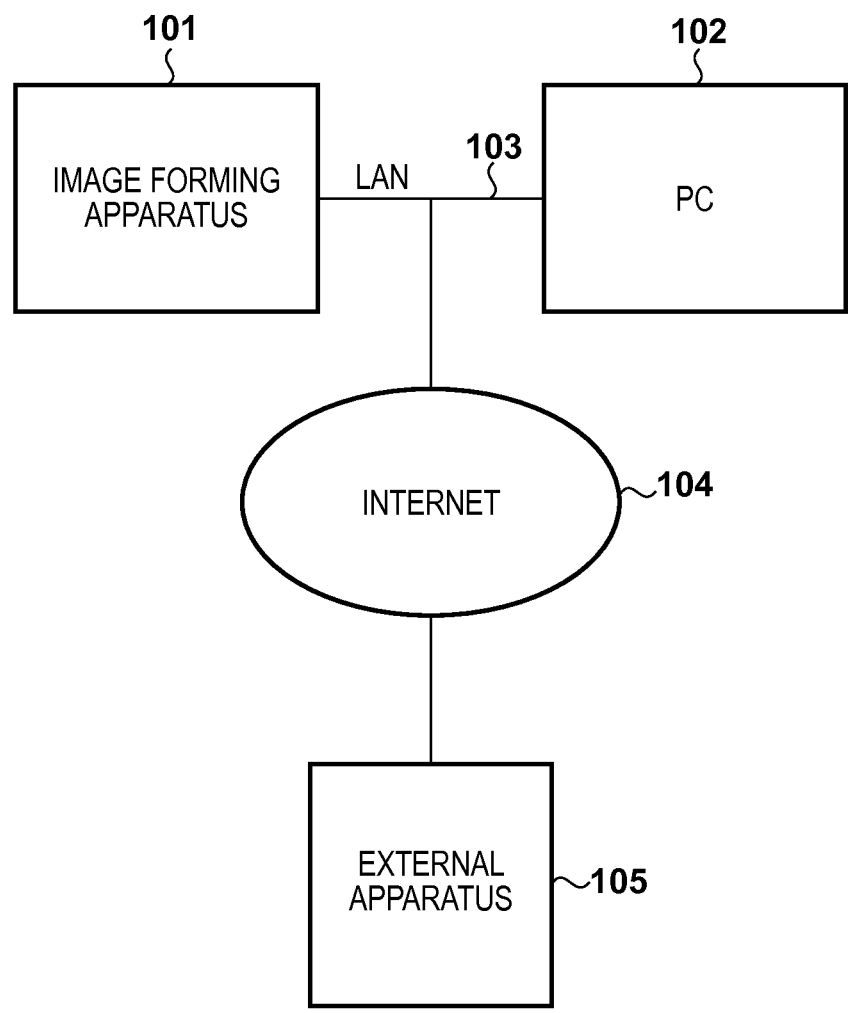
FIG. 1 is a diagram showing a system configuration of an image forming apparatus according to an embodiment of the present invention.

Hereinafter, embodiments for carrying out the present invention will be described with reference to the drawings.

<Definitions of Terms>

First, terms used in embodiments of the present invention will now be defined.

"Set value" indicates a parameter on software that is set within an image forming apparatus for switching the operation of the image forming apparatus.

"Personal setting information" indicates a set value or data that is managed for each user who uses the image forming apparatus. Examples thereof include button information, an address book, and the like that are set for an individual.

"Embedded program" indicates a program such as an application that is fixedly embedded in the image forming apparatus.

"Extension program" indicates a program such as a Java (registered trademark) application that can be subsequently installed.

"Cloud synchronization" indicates processing of synchronizing the data within the image forming apparatus and the data on the cloud. When a user logs in an image forming apparatus, the image forming apparatus downloads the data regarding the user that is managed on the cloud into the image forming apparatus. When a user edits the personal setting information on the image forming apparatus, the image forming apparatus uploads the edited data onto the cloud when the user logs out. The processes performed at the time of login and logout shall be collectively called "cloud synchronization".

"Permission" indicates an access right to a file within a disk or a specific procedure that affects the security. With an application written in Java (registered trademark), there is a mechanism for causing the application to declare permission to control a file access and the like. FIG. 15 shows an exemplary permission file. By writing a specific permission in this file, it is possible to authorize the application. For example, a file of personal setting information or the like is subject to access control using permission, and the authority for each operation, including, for example, read, write, and execution, can be defined for each user segment such as "Owner", who is a file owner, "Group", who is a user group that uses the system, or "Other", who is one of the other users. The subject for permission in the present embodiment in a direct sense is personal setting information saved in an embedded program user information holder, which will be described later. However, personal setting information saved in an external apparatus can be regarded as the subject.

While the foregoing describes the terms, terms other than those described above will be described as needed. The foregoing definitions are merely examples, and the present invention encompasses equivalent applications and functions in other systems and languages, in addition to Java (registered trademark) and Unix (registered trademark).

Embodiment 1

The present embodiment is an embodiment used when an extension program 303 (see FIG. 3) registers personal setting information, and the personal setting information is synchronized with personal setting information on an external apparatus 105. The present embodiment will be described in the following flow.

I. The extension program 303 specifies a registration destination of the personal setting information.

II. The extension program 303 registers the personal setting information.

III. The registered personal setting information and the personal setting information on the external apparatus 105 are synchronized.

<System and Hardware Configurations>

The system configuration of the present embodiment will be described with reference to FIG. 1.

An image forming apparatus 101 is a digital multifunctional image forming apparatus in which a print function, a copy function, a facsimile function, a transmission function (e.g., e-mail, FTP) are integrated, or an image forming apparatus such as a printer, a scanner, or a facsimile. In addition, the image forming apparatus 101 has a mechanism for managing a set value and an address book for each individual, and a user can reflect the set value or the like that are unique to that user on the image forming apparatus 101 by logging in when using the apparatus.

A personal computer (hereinafter referred to as "PC") 102 is a general-purpose personal computer, and includes a desktop computer and a notebook computer. When the personal setting information registered in the image forming apparatus 101 has reached the upper limit, the deletion of the personal setting information, which will be described later, is possible by establishing connection via a LAN 103.

The LAN 103 is a local area network. The image forming apparatus 101 can connect to another image forming apparatus (not shown), the PC 102, and the Internet 104 via the LAN 103.

Numeral 104 denotes the Internet. The Internet 104 may be implemented by a single network such as a Wide Area Network (WAN), a Local Area Network (LAN), or an ad-hoc network. Alternatively, the Internet 104 may be constituted by a complex of a plurality of WANs, LANs, or ad-hoc networks as needed. The Internet in the present embodiment is merely an example, and it is possible to use another communication network or a complex of networks.

The external apparatus 105 is an external apparatus that manages the personal setting information of the image forming apparatus 101. In the present embodiment, it is assumed that the external apparatus 105 is a cloud server connected to the image forming apparatus 101 via the Internet 104. However, the external apparatus 105 may be, for example, an internal server connected via the LAN 103.

Figure 2:
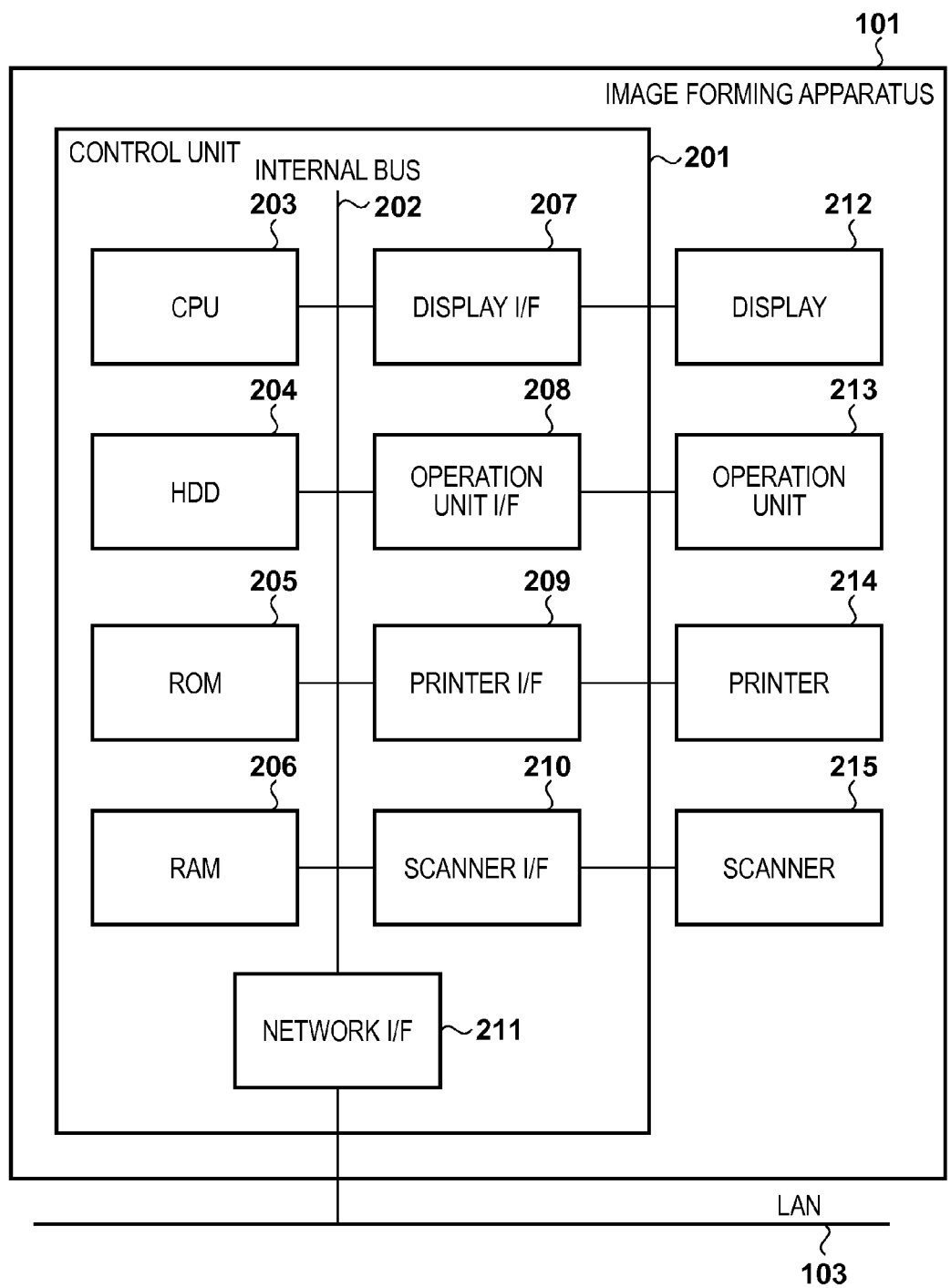
FIG. 2 is a diagram showing a hardware configuration of the image forming apparatus according to an embodiment of the present invention.

The hardware configuration of the present embodiment will be described with reference to FIG. 2.

A control unit 201 performs overall control of the image forming apparatus 101. An internal bus 202 connects various hardware constituent elements. A CPU 203 executes a control program stored in a ROM 205. An HDD 204 is a nonvolatile storage area, and holds a set value, an operating log, and the like. The HDD 204 is also a storage destination of the personal setting information, which is a feature of the present invention. The ROM 205 is a read-only nonvolatile storage area, and holds the control program of the image forming apparatus 101. A RAM 206 is a work memory area for executing a program, and is used as a temporary storage area. A display I/F 207 connects a display 212 to a control unit 201. An operation unit I/F 208 connects an operation unit 213 to the control unit 201. A printer I/F 209 connects a printer 214 to the control unit 201. A scanner I/F 210 connects a scanner 215 to the control unit 201. A network I/F 211 is an interface unit for establishing connection to the LAN 103, and communicates with an image forming apparatus (not shown) and the Internet 104 via the LAN 103. The display 212 displays error information and the like according to the state of a user operation and the image forming apparatus 101. The operation unit 213 includes a built-in key input unit, which is controlled by the CPU 203. The user performs various setting instructions relating to scanner reading and print output, and an operating/stopping instruction through key inputs. Note that the operation unit 213 may be a device directly operating on the display 212, for example, a touch panel, and is not particularly limited. The printer 214 performs printing of image data onto a recording medium. The image data to be printed by the printer 214 is transferred from the control unit 201 to the printer 214 via the printer I/F 209. The scanner 215 reads an image on a document, generates image data, and transfers the image data to the control unit 201 via the scanner I/F 210.

<Software Configuration>

Figure 3:
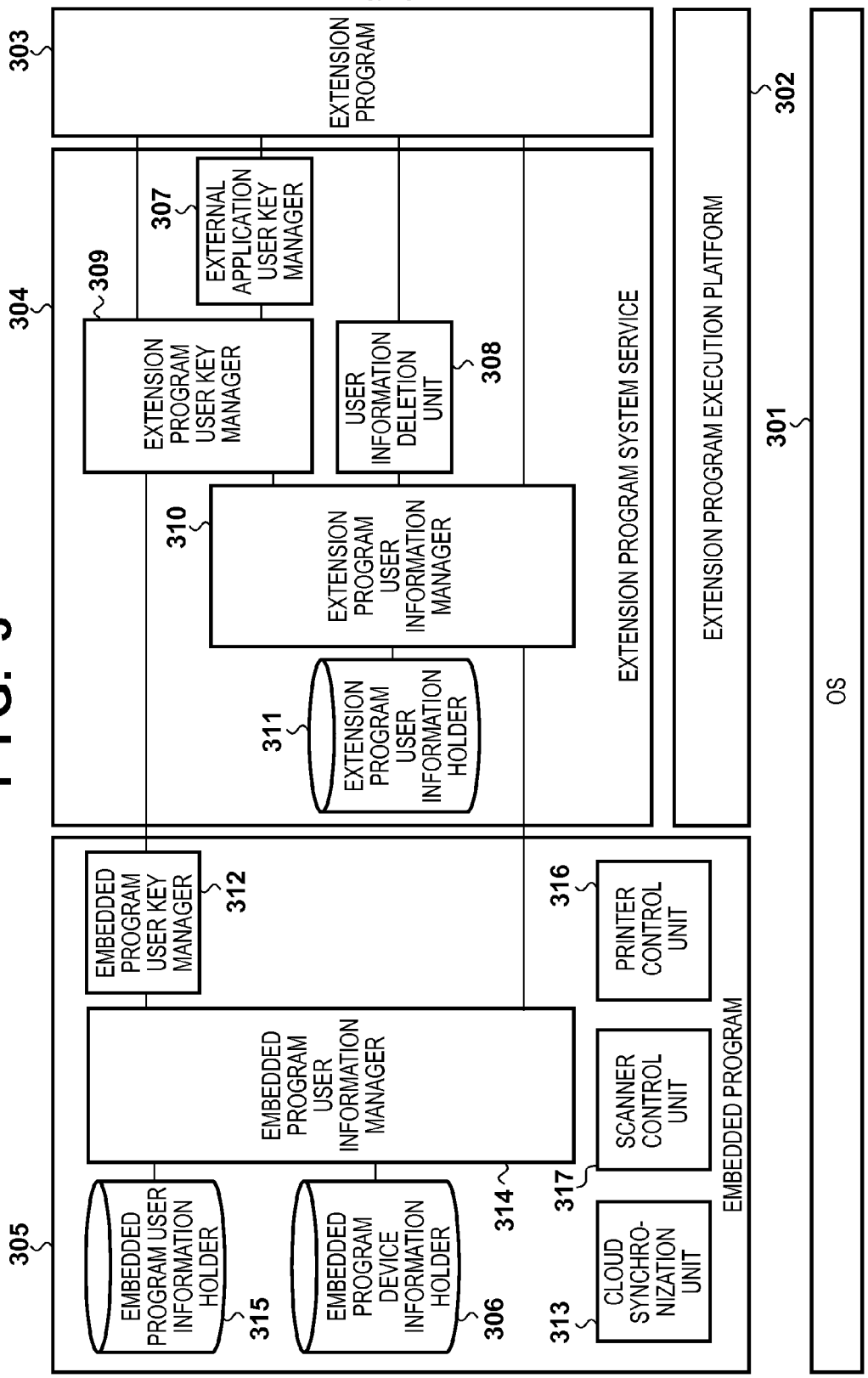
FIG. 3 is a diagram showing a software configuration of the image forming apparatus according to an embodiment of the present invention.

FIG. 3 is a diagram showing the software configuration of the image forming apparatus 101. The constituting units shown as squares in FIG. 3 indicate software. Note that each piece of software of the image forming apparatus 101 is saved in the ROM 205 or the HDD 204, and is executed by the CPU 203. In addition, various types of information used during execution are held in the RAM 206 or the HDD 204 so that the various types of information are exchanged between the software functions. Furthermore, the communication with the external apparatus is carried out using the network I/F 211. The following is a description of the various types of software.

An OS 301 is system software that provides the basic functions commonly used among a large number of pieces of application software, including, for example, an input/output function and disk and memory management, and manages the overall system.

An extension program execution platform 302 is a platform necessary for the operation of an extension program 303, and operates on the OS 301. By using the extension program execution platform 302, it is possible to operate the extension program 303 independent of the OS 301.

The extension program 303 is a program that operates on the extension program execution platform 302. The extension program 303 can access another extension program 303 and various modules, such as the RAM 205, of the image forming apparatus 101 only via the extension program execution platform 302 or an extension program system service 304.

The extension program system service 304 is a program that operates on the extension program execution platform 302. The extension program system service 304 is a utility library that is commonly useful among extension programs 303, and is provided by the system. A service can be used by calling the extension program system service 304 from the extension program 303.

An embedded program 305 is a control program inherently provided in a printer, a facsimile, a scanner, and the like.

An embedded program device information holder 306 holds set values and data that are desired to be commonly used by all users of the image forming apparatus 101. For example, information on a common shortcut button, common password information of an external server, and the like correspond to such set values and data.

An external application user key manager 307 is a service that manages password information, and is open to an external application, which is a third party extension program 303. The external application user key manager 307 serves as an intermediary of an extension program user key manager 309, which will be described later, and is provided with part of its function being restricted, in view of the fact that it is used by a third party program.

A user information deletion unit 308 deletes personal setting information managed by an extension program user information manager 310 and an embedded program user information manager 314, which will be described later. The user information deletion unit 308 provides a servlet function, and the user can delete the personal setting information from a web browser on the PC 102.

The extension program user key manager 309 is a function for managing, in particular, the password information of the external server or the like among the personal setting information, and manages the password information handled by the extension program 303. The extension program user key manager 309 serves as an intermediary of an embedded program user key manager 312, which will be described later.

The extension program user information manager 310 provides a function for managing the personal setting information handled by the extension program.

An extension program user information holder 311 holds the personal setting information managed by the extension program user information manager 310.

<Personal Setting Information>

Figure 10:
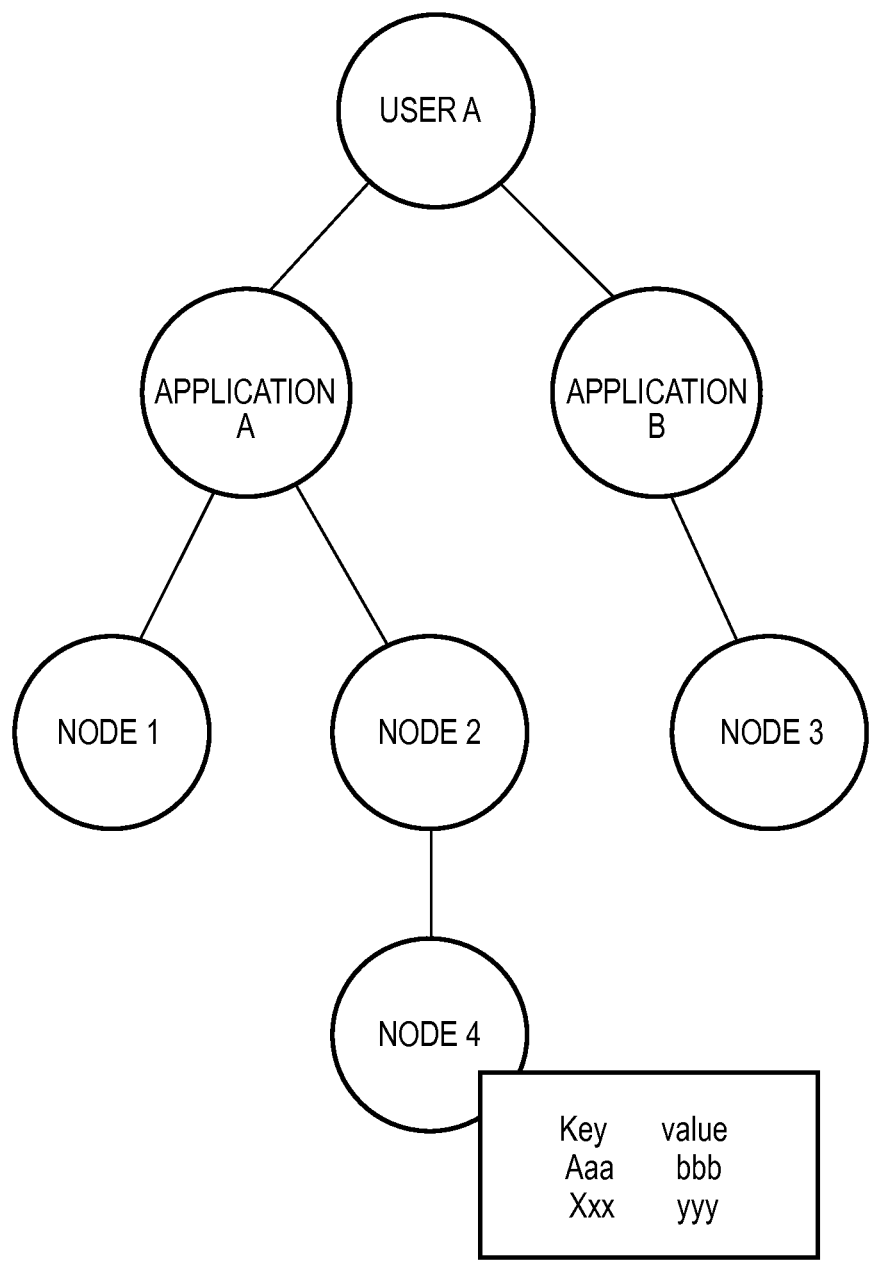
FIG. 10 is a conceptual diagram of a data structure used when personal setting information is managed.

Here, the personal setting information will now be described with reference to FIG. 10. FIG. 10 is a conceptual diagram of a data structure of the personal setting information held in the extension program user information holder 311. The personal setting information is managed in a tree structure in which the top node is a user node, a node beneath the top node is an application node, and a node therebeneath is any given node. Each user has an access right only to the data beneath the user's own node, which is owned by the user. Each application has an access right only to the data beneath its own application node.

In the example shown in FIG. 10, the personal setting information regarding user A is held for application A and application B. The personal setting information is held in the key-value format, and is registered in any given node. That is, the personal setting information can be defined on a program-by-program basis for each user. In addition, as discussed above, in order to ensure the performance and the security of cloud synchronization, the personal setting information held in the extension program user information holder 311 cannot be synchronized with the external apparatus 105. In the present embodiment, the personal setting information is saved by the extension program user information holder 311 and an embedded program user information holder 315 in accordance with the authority granted to the extension program.

Returning to the description of FIG. 3, the embedded program user key manager 312 is a function for managing, in particular, the password information of the external server and the like among the personal setting information. The embedded program user key manager 312 manages the password information handled by the embedded program.

A cloud synchronization unit 313 synchronizes the personal setting information managed on the external apparatus 105 and the personal setting information held in the embedded program user information holder 315, which will be described later. When a user logs in the image forming apparatus 101, the cloud synchronization unit 313 acquires the personal setting information regarding that user from the external apparatus 105. When a user logs out of the image forming apparatus 101, the cloud synchronization unit 313 transmits the user's personal setting information held in the embedded program user information holder 315 to the external apparatus 105. The external apparatus 105 updates the user's personal setting information by using the received personal setting information.

The embedded program user information manager 314 manages the personal setting information handled by the embedded program.

The embedded program user information holder 315 holds the personal setting information of the embedded program.

A printer control unit 316 is a program that controls the printer 214 via the printer I/F 209. A scanner control unit 317 is a program that controls the scanner 215 via the scanner I/F 210.

<1. Extension Program 303 Specifies Registration Destination of Personal Setting Information>

Figure 4:
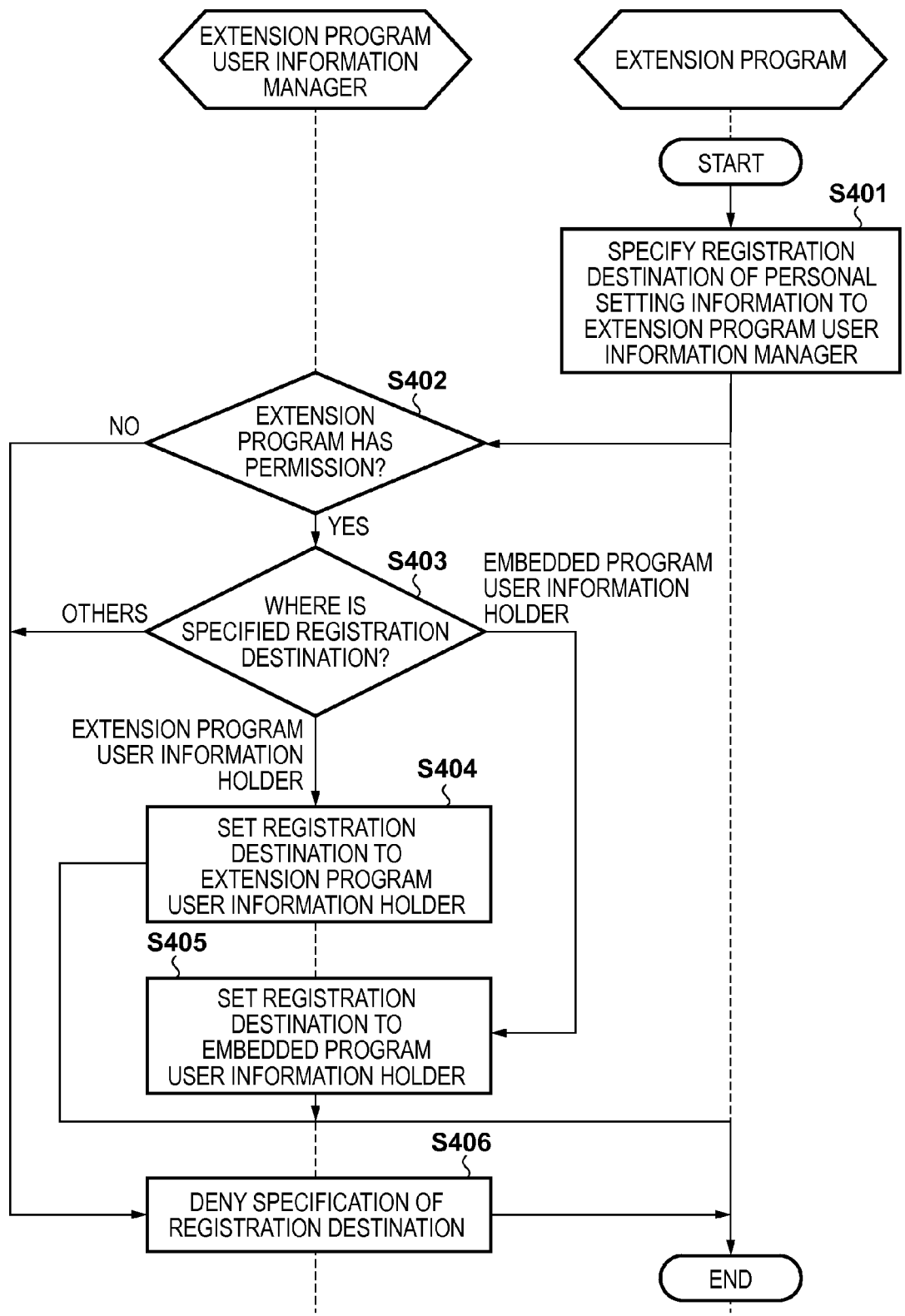
FIG. 4 is a flowchart of the procedure for specifying a registration destination of personal setting information in Embodiment 1.

FIG. 4 is a flowchart illustrating the flow in which the extension program 303 specifies a registration destination of the personal setting information to the extension program user information manager 310 in the present embodiment. As described above, the personal setting information held in the extension program user information holder 311 cannot be synchronized with the external apparatus 105. Accordingly, when the extension program 303 wishes to synchronize the personal setting information with the external apparatus 105, the extension program 303 needs to specify the embedded program user information holder 315 as a registration destination in accordance with the present flowchart. The reason for this is that the personal setting information held in the embedded program user information holder 315 can be synchronized with the external apparatus 105 by the cloud synchronization unit 313.

The flow in FIG. 4 starts from a step at which the extension program 303 specifies a registration destination of the personal setting information, and ends with a step at which the extension program user information manager 310 accepts/denies the specification of the registration destination performed by the extension program 303.

Step S401 is a step at which the extension program 303 specifies a registration destination or saving destination of the personal setting information to the extension program user information manager 310. The specification is performed, for example, by causing the display 212 to display a specification screen for the registration destination of the personal setting information by a predetermined operation, and thereafter causing the operation unit 213 to input the registration destination.

Step S402 is a step at which the extension program user information manager 310 checks permission held by the extension program 303. The default registration destination of the personal setting information handled by the extension program 303 is the extension program user information holder 311. However, an extension program 303 holding a specific permission has authority to specify the embedded program user information holder 315 as the registration destination. At the present step S402, the extension program user information manager 310 determines whether the extension program 303 has authority to specify the registration destination based on the permission. If the extension program 303 has the specific permission, the procedure proceeds to step S403, and if not, the procedure proceeds to step S406. Note that the specific permission is, for example, the authority to read and write from and into the user information file of the relevant user.

Step S403 is a step at which the extension program user information manager 310 checks the registration destination specified by the extension program 303. There are three registration destinations of the setting information, namely, the extension program user information holder 311, the embedded program user information holder 315, and the embedded program device information holder 306. Among them, only the extension program user information holder 311 and the embedded program user information holder 315 can be accessed from the extension program 303. This is to prevent the extension program 303 from accessing the embedded program device information holder 306, which holds the set values and the like for devices common to all users, thus affecting the operations of the devices. Accordingly, even an extension program 303 that is determined at the above-described step S402 as holding the specific authority cannot specify any destination other than the extension program user information holder 311 and the embedded program user information holder 315.

The present step S403 determines whether the specified registration destination is other than the above-described two destinations. If the registration destination is specified as the extension program user information holder 311, the procedure proceeds to step S404, if the registration destination is specified as the embedded program user information holder 315, the procedure proceeds to step S405, and otherwise, the procedure proceeds to S406.

Step S404 is a step at which the extension program user information manager 310 sets the registration destination of the personal setting information to the extension program user information holder 311.

Step S405 is a step at which the extension program user information manager 310 sets the registration destination of the personal setting information to the embedded program user information holder 315.

Step S406 is a step at which the extension program user information manager 310 denies the specification of the registration destination performed by the embedded program 303. At the present step S406, the extension program user information manager 310 denies the specification if it is determined at the above-described step S402 that the extension program 303 has no authority, or if it is determined at the above-described step S403 that the registration destination is set to a destination other than the extension program user information holder 311 and the embedded program user information holder 315. The denial is performed, for example, by displaying a deny message on a screen on the display 212 to which an instruction for the registration destination has been input.

In the above-described manner, only an extension program 303 holding a specific permission can specify the embedded program user information holder 315 as the registration destination of the personal setting information, and can synchronize the personal setting information with the external apparatus 105. By not granting permission to a third party extension program 303, it is possible to perform synchronization while distinguishing the data of a third party extension program 303 from the data of a company's own extension program 303. In addition, by preventing a program from specifying the embedded program device information holder 306 as the registration destination even if the program has permission, it is possible to completely block an access to data by the extension program 303 that affects the operation of devices. In order to prevent a program having permission from specifying the embedded program device information holder 306 as the registration destination, for example, authority that prevents the specification of the embedded program device information holder 306 as the registration destination is provided as the authority indicated by the permission. Alternatively, it is possible to adopt a method in which, for example, the manufacturer information, among the attribute information of the extension program to which permission has been granted, is referred to, and the extension program of a manufacturer that is different from the manufacturer of the image forming apparatus is prevented from specifying the embedded program device information holder 306 as the registration destination.

<II. Extension Program 303 Registers Personal Setting Information>

Figure 5:
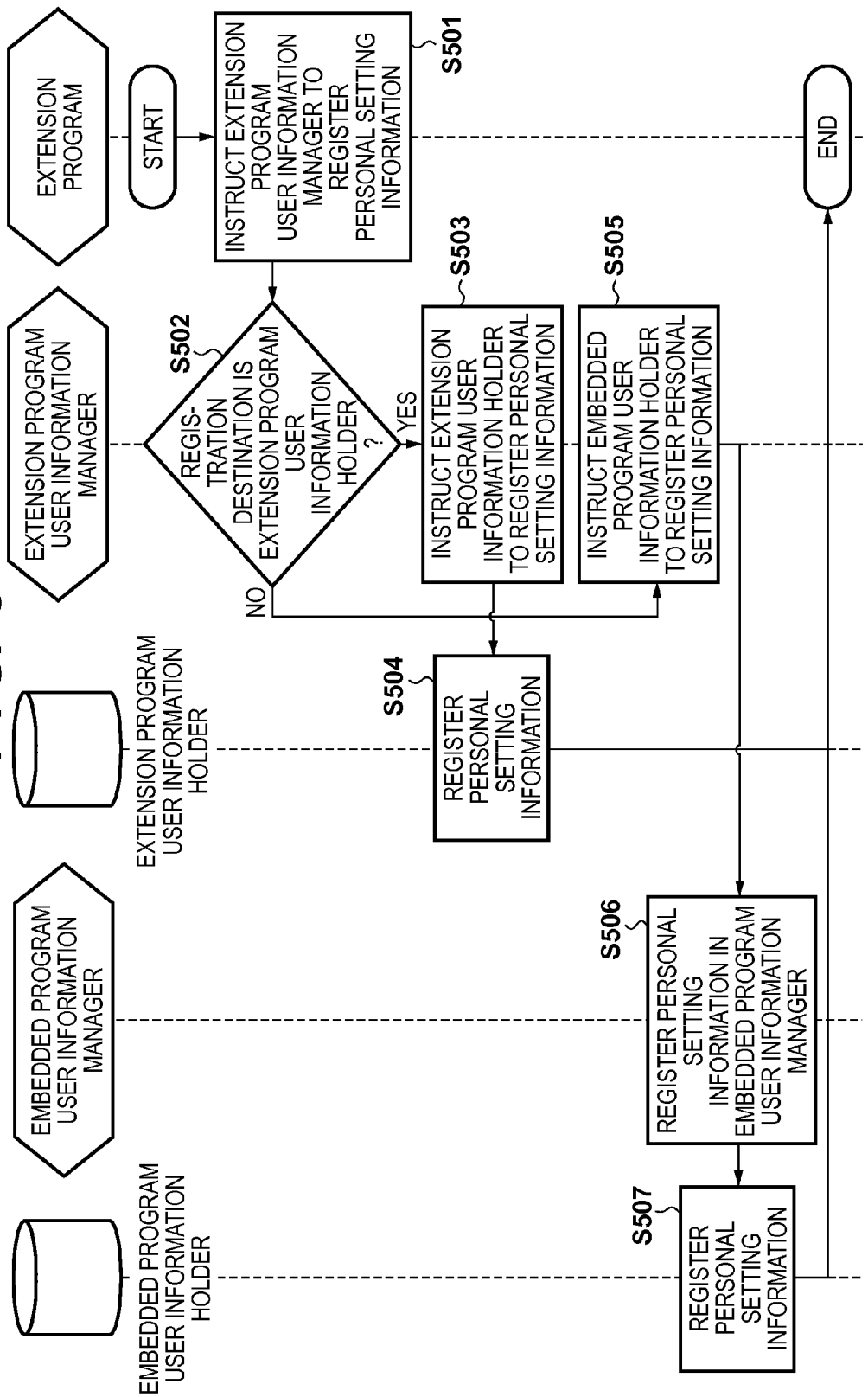
FIG. 5 is a flowchart of the procedure for registering personal setting information in Embodiment 1.

FIG. 5 is a flowchart illustrating the flow used when the extension program 303 registers the personal setting information via the extension program user information manager 310 in the present embodiment. The present flowchart starts from a step at which the extension program 303 instructs the extension program user information manager 310 to register the personal setting information. The flowchart ends with a step at which the personal setting information is registered in the extension program user information holder 311 or the embedded program user information holder 315. Note that the present flowchart is performed after the registration destination of the personal setting information has been set in the flowchart in FIG. 4.

Step S501 is a step at which the extension program 303 instructs the extension program user information manager 310 to register the personal setting information.

Step S502 is a step at which the extension program user information manager 310 checks the registration destination of the personal setting information. In the flowchart in FIG. 4, if the registration destination of the personal setting information has been previously specified, that registration destination is checked. If no registration destination is set or if the specification of the registration destination has been denied at step S406 in FIG. 4, the extension program user information holder 311 is set as the default registration destination. If the set registration destination is the extension program user information holder 311, the procedure proceeds to step S503, and if the set registration destination is the embedded program user information holder 315, the procedure proceeds to step S505.

Step S503 is a step at which the extension program user information manager 310 registers the personal setting information in the extension program user information holder 311.

Step S504 is a step at which the extension program user information holder 311 stores the personal setting information.

Step S505 is a step at which the extension program user information manager 310 instructs the embedded program user information manager 314 to register the personal setting information.

Step S506 is a step at which the embedded program user information manager 314 registers the personal setting information in the embedded program user information holder 315.

Step S507 is a step at which the embedded program user information holder 315 stores the personal setting information.

In the above-described manner, the extension program 303 can register the personal setting information in the previously specified registration destination.

<III. Registered Personal Setting Information and Personal Setting Information on External Apparatus 105 are Synchronized>

Figure 6:
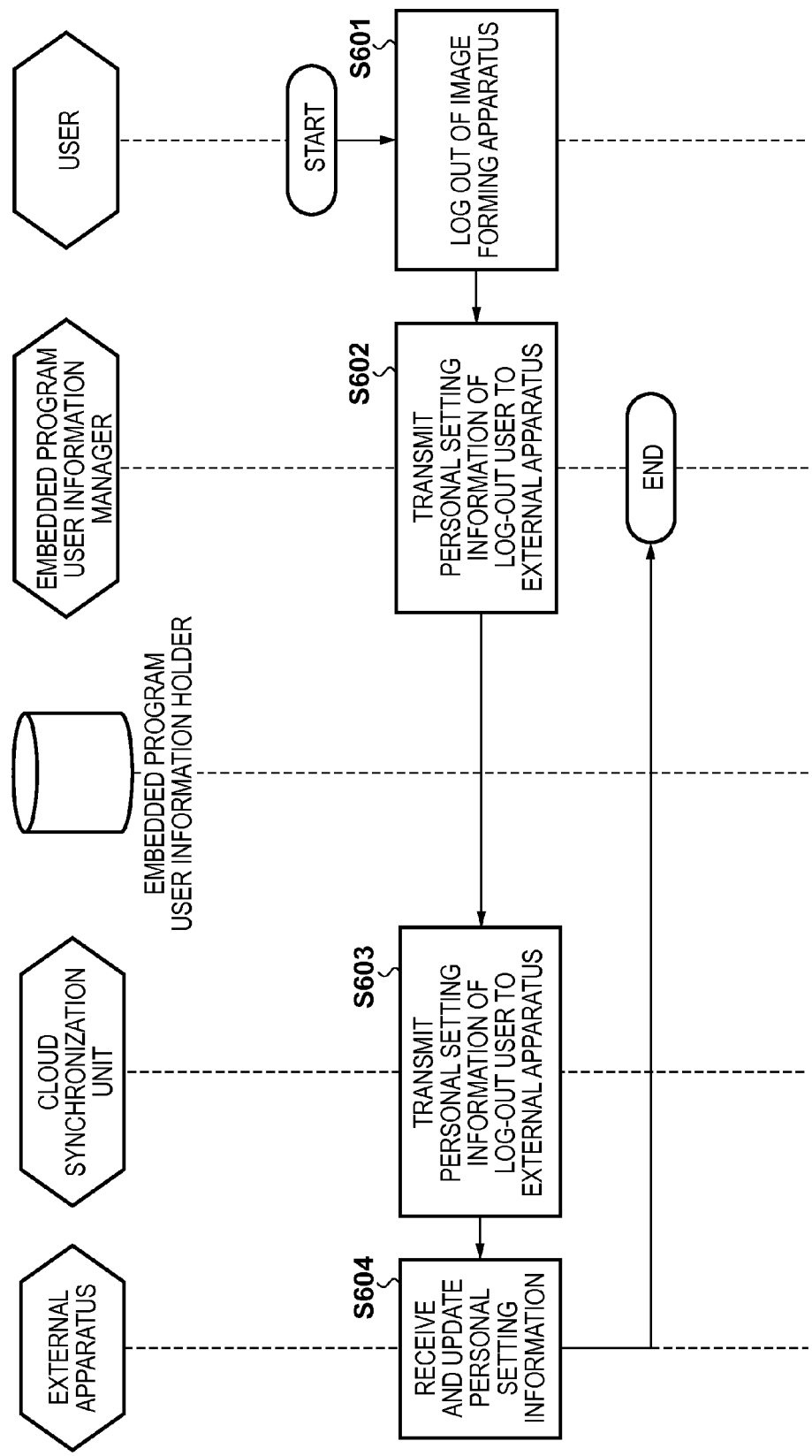
FIG. 6 is a flowchart of the procedure for synchronizing personal setting information with an external apparatus when a user logs out in Embodiment 1.

FIG. 6 is a flowchart illustrating the flow used when the personal setting information registered in the image forming apparatus 101 is transmitted to the external apparatus 105. The present flowchart starts from a step at which the user logs out of the image forming apparatus 101, and ends with a step at which the external apparatus 105 accepts the personal setting information sent from the image forming apparatus 101. The flow in which the personal setting information registered in the embedded program user information holder 315 is synchronized with the personal setting information on the external apparatus 105 will now be described with reference to the present flowchart and a flowchart in FIG. 7, which will be described below. Note that if the personal setting information has been changed by an extension program while the user is logging in, such change is reflected on the personal setting information registered in the embedded program user information holder 315 or the extension program user information holder 310 in accordance with the authority of that extension program prior to a user logout.

Step S601 is a step at which the user logs out of the image forming apparatus 101.

Step S602 is a step at which the embedded program user information manager 314 detects the user logout, and instructs the cloud synchronization unit 313 to transmit the personal setting information of that user onto the external apparatus 105.

Step S603 is a step at which the cloud synchronization unit 313 transmits the personal setting information to the external apparatus 105. Note that the subject to be transmitted is the log-in user's personal setting information, and if the personal setting information of the log-in user that should be synchronized is not saved in the embedded program user information holder 315, the processing may end without performing the steps following this step.

Step S604 is a step at which the external apparatus 105 receives the personal setting information from the image forming apparatus 101, and store the information.

In the above-described manner, the personal setting information that has been edited on the image forming apparatus 101 is transmitted to the external apparatus 105 with a user logout as a trigger. Then, if the personal setting information of the user that corresponds to the received personal setting information is not saved, the external apparatus 105 newly saves the personal setting information, and if it has already been saved, the external apparatus 105 merges or overwrites that personal setting information with the received personal setting information to update the personal setting information.

Figure 7:
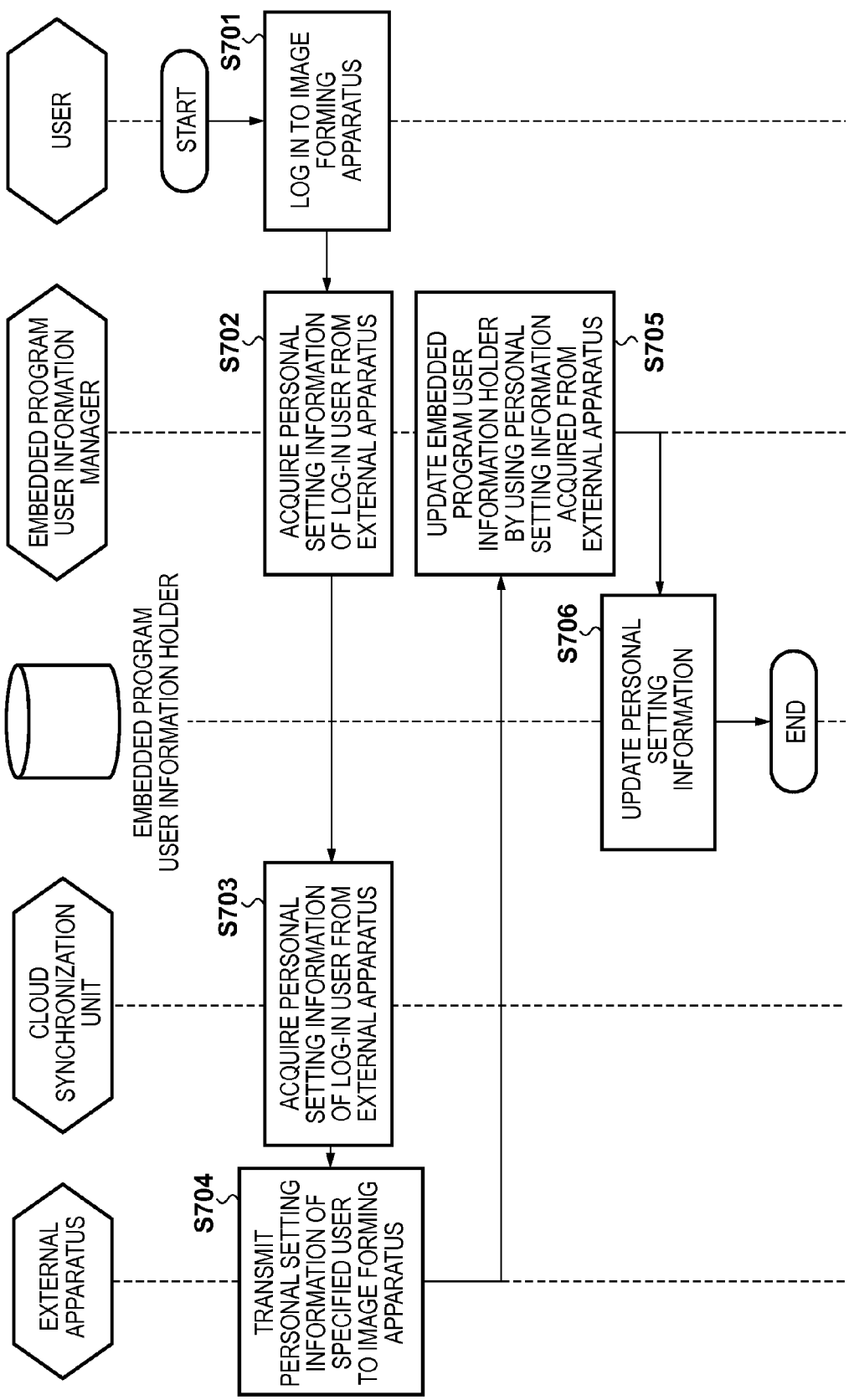
FIG. 7 is a flowchart of the procedure for synchronizing personal setting information with an external apparatus when a user logs in in Embodiment 1.

FIG. 7 is a flowchart illustrating the flow used when the personal setting information held in the external apparatus 105 is transmitted to the image forming apparatus 101. The present flowchart starts from a step at which the user logs in the image forming apparatus 101, and ends with a step at which the embedded program user information holder 315 reflects the personal setting information transmitted from the external apparatus 105. The procedure shown in FIG. 7 is performed by the CPU 203 of the image forming apparatus 101 in terms of hardware.

Step S701 is a step at which the user logs in the image forming apparatus 101.

Step S702 is a step at which the embedded program user information manager 314 detects the user login, and instructs the cloud synchronization unit 313 to acquire the personal setting information of the user from the external apparatus 105. Note that the subject to be acquired is the personal setting information of the log-in user, and if the personal setting information of the long-in user that should be synchronized is not saved in the embedded program user information holder 315, the processing may end without performing the steps following this step.

Step S703 is a step at which the cloud synchronization unit 313 requests the personal setting information from the external apparatus 105.

Step S704 is a step at which the external apparatus 105 transmits the requested personal setting information to the image forming apparatus 101.

Step S705 is a step at which the embedded program user information manager 314 reflects the personal setting information of the log-in user that has been acquired from the external apparatus 105 in the embedded program user information holder 315.

Step S706 is a step at which the embedded program user information holder 315 reflects the personal setting information acquired from the external apparatus 105.

In the above-described manner, when a user has logged in, the personal setting information of the user can be acquired from the external apparatus 105.

According to the present embodiment, the personal setting information of the extension program 303 can be synchronized in accordance with the permission of the extension program 303. More specifically, the personal setting information handled by an extension program 303 having no permission, or in other words, that does not have access authority to the personal setting information registered in the embedded program user information holder 315 is held in the extension program user information holder 311, and is thereby excluded from synchronization. On the other hand, an extension program 303 having permission can synchronize the personal setting information by specifying the embedded program user information holder 315 as the registration destination. The synchronization timing is such that the personal setting information within the embedded program user information holder 315 is transmitted to the external apparatus 105 when a user logs out. Also, synchronization can be achieved by acquiring the personal setting information within the external apparatus 105 into the embedded program user information holder 315 when a user logs in. Furthermore, it is possible to perform control such that the extension program 303 is prevented from accessing the embedded program device information holder 306, regardless of whether or not it has permission.

Embodiment 2

The present embodiment is an embodiment used when the extension program is notified of the fact that the personal setting information held in the embedded program user information holder 315 has been updated by the external apparatus 105. As described above, the synchronization of the personal setting information between the image forming apparatus 101 and the external apparatus 105 is performed in conjunction with a user login/logout. When editing or the like of the personal setting information is performed after a user has logged in, the personal setting information may be undergoing cloud synchronization internally, and it is necessary to perform exclusive control for preventing data mismatch. While the exclusive control itself is performed in a database, it is also necessary to take procedures such as locking of the operation unit 213 and displaying of a warning message in each application in order to prevent the user from editing. The update notification function described in the present embodiment is used in order for each application to detect the start and the end of cloud synchronization and to perform appropriate processing. The present embodiment is composed of the following processes.

I. Register Listener.
II. Receive Update Notification.
  The system configuration, hardware configuration, and software configuration of the present embodiment are the same as those of Embodiment 1, and therefore, the description thereof has been omitted.

<I. Register Listener>

Figure 8:
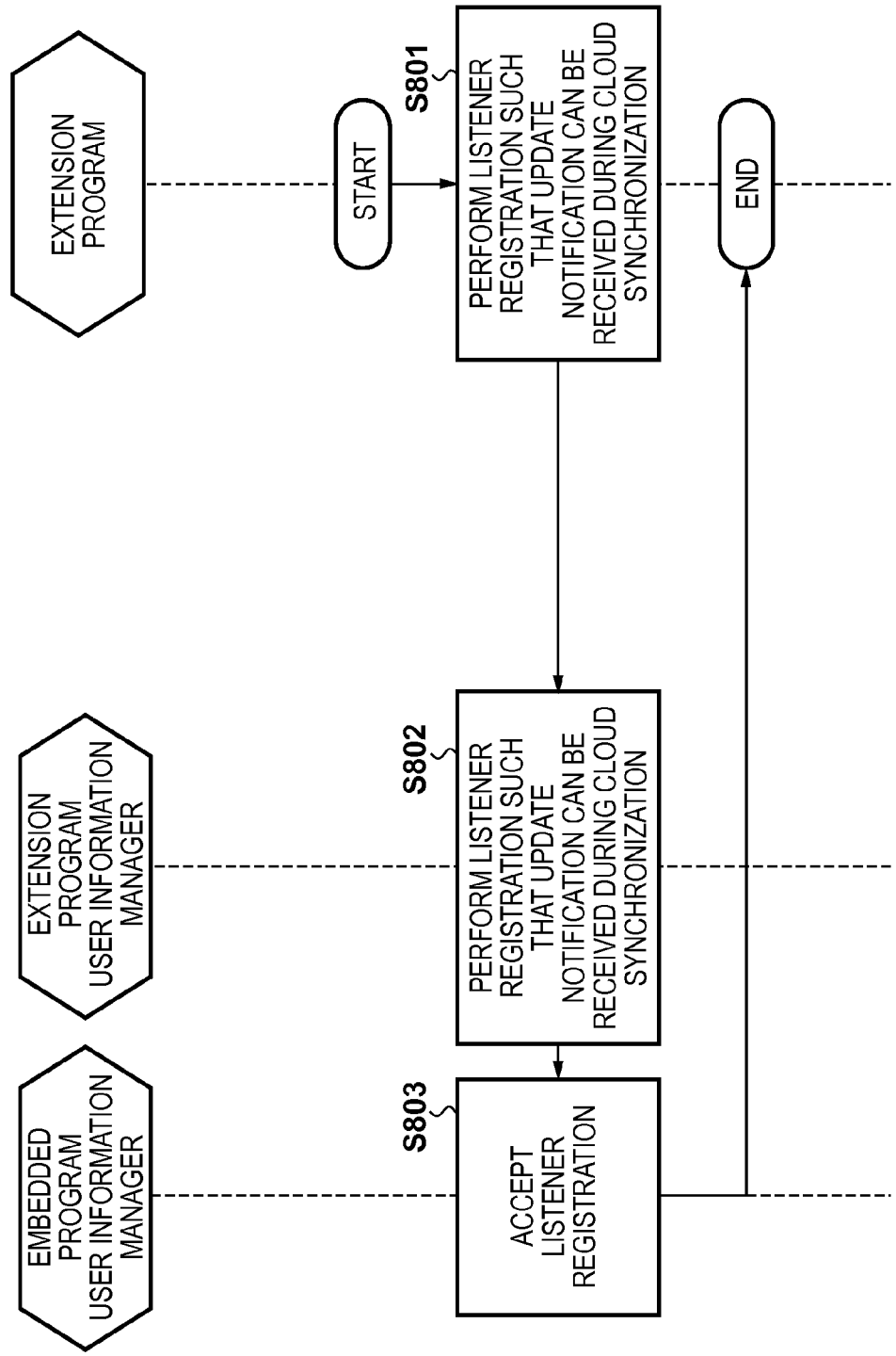
FIG. 8 is a flowchart of the procedure for registering a listener of an event notification indicating data update in Embodiment 2.

FIG. 8 is a flowchart illustrating the flow used when the extension program 303 registers a listener. The present flowchart starts from a step at which the extension program 303 instructs a listener registration, and ends with a step at which the embedded program user information manager 314 accepts the listener registration.

Step S801 is a step at which the extension program 303 instructs a listener registration to the extension program user information manager 310. At the time of registering a listener, the conditions for the event notification are set in detail.

Here, exemplary notification conditions for the event notification to the extension program 303 serving as a registrant will be described with referent to FIG. 9.

Notification method 901 defines how notification is performed when update or the like of the personal setting information has been performed. All node information 902 is specification of a condition that event notifications for all nodes are performed as the notification method. When this condition 902 is specified, if a plurality of nodes of the personal setting information have been updated, update events for all the update nodes are notified. Per-application 903 is specification of a condition that the notification method is on a per-application basis. When the personal setting information has been updated, an update event of the corresponding application node is notified. Higher level node 904 is specification of a condition that the notification method is such that notification is performed only for a higher level node. When the personal setting information has been updated in a plurality of nodes, an update event of a common higher level node of the plurality of nodes is notified. When only a single node has been updated, an update event of, for example, the node immediately thereabove is notified. If the top node has been updated, an update event of that node may be notified.

Notification processing type 905 is a condition specifying the notification processing type. It specifies the type of operation for which an event notification is to be performed. Deletion processing 906 is specification of a condition that the deletion processing is set as the notification processing type. An event notification is performed when the personal setting information has been deleted. Cloud synchronization processing 907 is specification of a condition that cloud synchronization processing is set as the notification processing type. An event notification is performed when the personal setting information has been updated by cloud synchronization. In addition, when the cloud synchronization processing 907 is set, an event indicating timing before the start of synchronization processing and an event indicating timing after the start of synchronization processing are notified as separate events, for example. Registration processing 908 is specification of a condition that registration processing is set as the notification processing type. An event notification is performed when the personal setting information has been registered.

Unit of notification 909 is a condition that defines the unit of notification. Per-application 910 is specification of a condition that the unit of notification is set to an application node. An event notification is performed when processing corresponding to the notification processing type 905 is performed under a specified application node. Per-Node 911 is a specification of a condition that the unit of notification is set to a specified node. An event notification is performed when processing corresponding to the notification processing type 905 is performed for the specified node. Per-recursive node 912 is a specification of condition that the unit of notification is set to a node beneath a specified node. An event notification is performed when processing corresponding to the notification processing type 905 is performed for a node beneath the specified node.

Notification timing 913 is a condition that defines the timing of notification. After-change 914 is specification of a condition that the notification timing is after the end of processing. If processing corresponding to the notification processing type 905 is performed on the node corresponding to the unit of notification 909, an event notification is performed after the processing has ended. Before-commitment 915 is specification of a condition that the notification timing is immediately after commitment to the database. If processing corresponding to the notification processing type 905 is performed on the node corresponding to the unit of notification 909, an event notification is performed immediately before commitment to the database by the processing. After-commitment 916 is specification of a condition that the notification timing is immediately after commitment to the database. If processing corresponding to the notification processing type 905 is performed on the node corresponding to the unit of notification 909, an event notification is performed immediately after commitment to the database by that processing.

Figure 9:
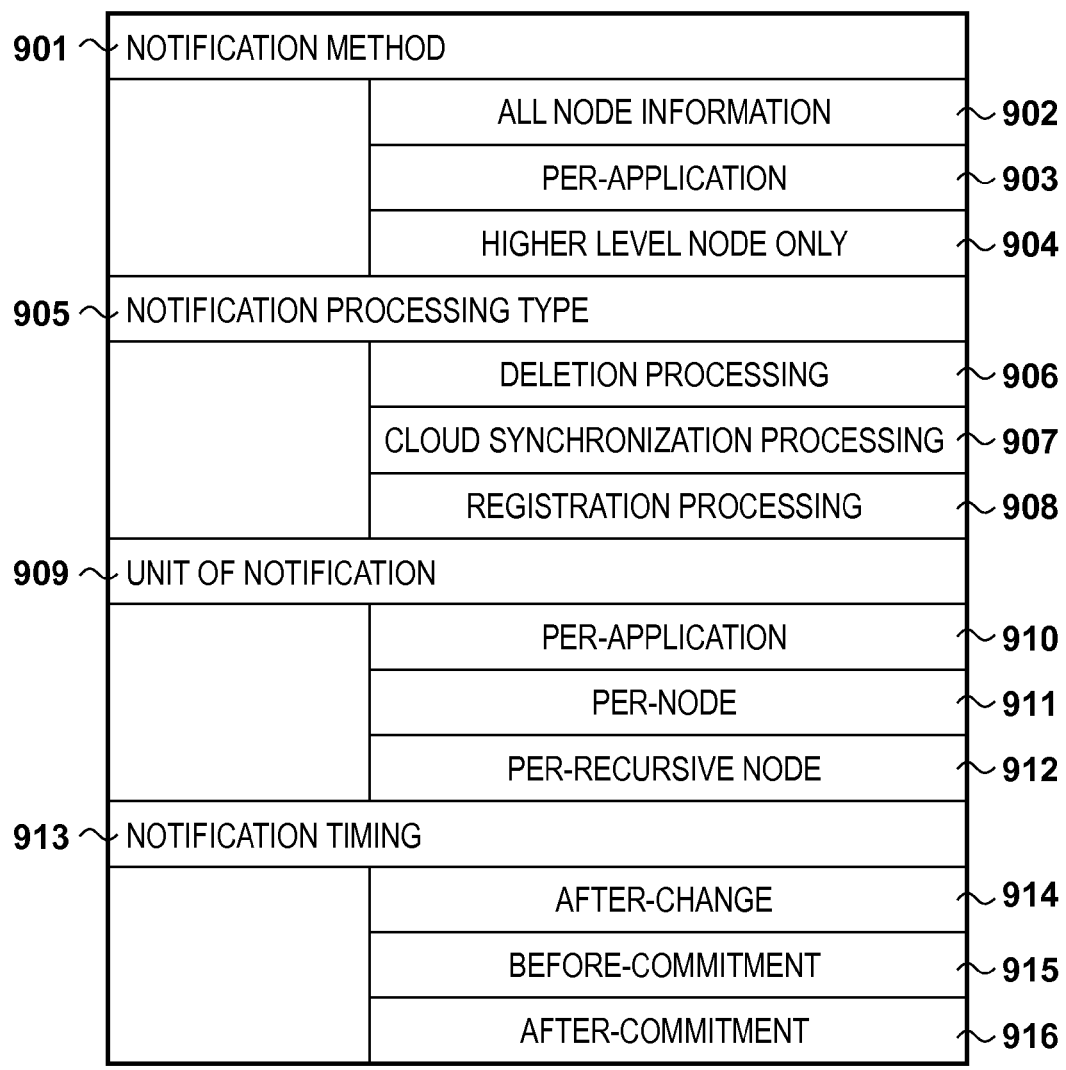
FIG. 9 is a diagram showing exemplary notification conditions used when a listener of an event notification indicating data update is registered in Embodiment 2.

Note that the conditions shown in FIG. 9 are merely examples, and the present invention is not limited thereto.

Returning to the description of FIG. 8, step S802 is a step at which the extension program user information manager 310 requests the embedded program user information manager 314 to perform a listener registration.

Step S803 is a step at which the embedded program user information manager 314 accepts the listener registration.

In the above-described manner, by specifying the conditions of the event notification in detail at the time of the listener registration, the extension program 303 that has performed the listener registration can receive the event notification under the specified conditions. Note that in order to maintain the consistency of the personal setting information, the cloud synchronization processing 907 is set as the notification processing type 905, for example. Thereby, an operation such as making a change to the personal setting information of the embedded program user information holder 315 is locked before the cloud synchronization processing, and the locking is cancelled after the processing. Note that it is sufficient that the locking is performed within a range that is accessed by the extension application that has performed the listener registration, and therefore, the notification method and the unit of notification may be set to a per-application basis, for example. With such a setting, a setting change based on the personal setting information read out prior to the locking is permitted to be reflected after cancellation of the locking. Accordingly, there is the risk that the setting change made by cloud synchronization may be lost. To prevent this, changing of the personal setting information may be prohibited immediately after a user login, and changing of the personal setting information may be permitted after completion of synchronization processing. Note that the above-described settings are merely examples, and there are other settings that can achieve appropriate exclusive control. The range of the personal setting information that is accessed by at least the extension application and is subjected to cloud synchronization is the subject of exclusive control, and thus, the conditions for the listener registration may be set such that the extension application 303 can be notified of the fact that cloud synchronization is performed for that range.

<ii. Receive Update Notification>

FIG. 11 is a flowchart illustrating the flow used when event notification is performed on the extension program 303 during cloud synchronization. The present flowchart starts from a step at which the cloud synchronization unit 313 acquires the personal setting information from the external apparatus 105, and ends with a step at which the extension program 303 receives an event notification indicating the end of cloud synchronization. Note that the present flowchart is described assuming that the extension program 303 has previously performed a listener registration in accordance with the flowchart in FIG. 8.

Step S1101 is a step at which the cloud synchronization unit 313 acquires the personal setting information from the external apparatus 105. As described above, when a user logs in the image forming apparatus 101, the personal setting information relating to that user is downloaded from the external apparatus 105.

Step S1102 is a step at which the embedded program user information manager 314 notifies an event indicating the start of cloud synchronization. Here, the event notification is performed for the extension application 303 that has performed the listener registration specifying that the cloud synchronization processing 907 as the notification processing type 905, in accordance with the notification condition registered by that application.

Step S1103 is a step at which the extension program user information manager 310 notifies the event indicating the start of cloud synchronization, which has been received from the embedded program user information manager 314, to the extension program 303.

Step S1104 is a step at which the extension program 303 receives the event indicating the start of cloud synchronization. The extension program 303 receives the event indicating the start of cloud synchronization, and may perform, for example, locking of the operation unit 213 or displaying of a warning message, in order to prevent the personal setting information from being edited during cloud synchronization.

Step S1105 is a step at which the embedded program user information manager 314 reflects the personal setting information acquired from the external apparatus 105 in the embedded program user information holder 315.

Step S1106 is a step at which the embedded program user information holder 315 stores the personal setting information acquired from the external apparatus 105.

Step S1107 is a step at which the embedded program user information manager 314 notifies an event indicating the end of cloud synchronization.

Step S1108 is a step at which the extension program user information manager 310 notifies an event indicating the end of cloud synchronization to the extension program 303.

Step S1109 is a step at which the extension program 303 receives an event indicating the end of cloud synchronization. Upon receipt of the notification indicating the end of the cloud synchronization, the extension program 303 performs, for example, displaying of a message notifying the end of synchronization or reading of the synchronized personal setting information.

In the above-described manner, the extension program 303 can receive event notifications before and after the processing of cloud synchronization, and perform appropriate processing.

Embodiment 3

In the present embodiment, a description will be given of the deletion of the personal setting information by the user. The upper limit of the number of users for whom personal setting information can be registered is set for the image forming apparatus 101, and a mechanism capable of deleting the personal setting information of unwanted users is provided in order to secure the capacity. In Embodiment 1, the personal setting information of the user is held in the embedded program user information holder 315 and the extension program user information holder 311. That is, when the user deletes the personal setting information, it is necessary that the user can perform the deletion without being aware of the storage location. Accordingly, in the present embodiment, a description will be given of an example in which the user deletes the personal setting information without being aware of the storage location of the personal setting information. The system configuration, hardware configuration, and software configuration of the present embodiment are the same as those of Embodiment 1, and therefore, the description thereof has been omitted.

FIG. 12 is a flowchart illustrating the flow used when a user deletes the personal setting information. The present flowchart starts from a step at which the user instructs deletion of the personal setting information, and ends with a step at which the embedded program user information manager 314 deletes the personal setting information held in the embedded program user information holder 315.

Step S1201 is a step at which the user instructs the user information deletion unit 308 to delete the personal setting information. The user information deletion unit 308 has a servlet function, and the user gives an instruction to delete the personal setting information from the web browser on the PC 102.

Figure 13A:
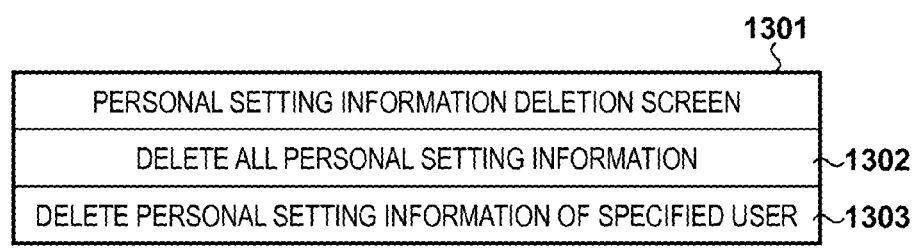
FIGS. 13A and 13B show examples of a personal setting information deletion screen in Embodiment 3.
Figure 13B:
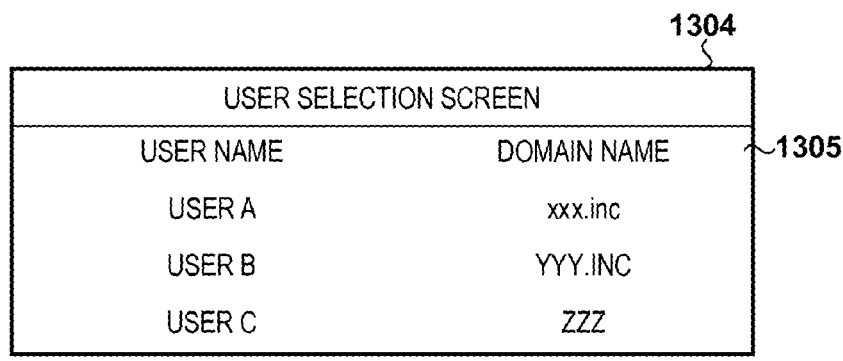

FIGS. 13A and 13B show examples of a deletion screen provided by the user information deletion unit 308.

A screen 1301 in FIG. 13A is a deletion screen for the personal setting information.

A button 1302 is a button for deleting all personal setting information. When the user depresses 1302, all the personal setting information held in the embedded program user information holder 315 and the extension program user information holder 311 is deleted.

A button 1303 is a button for deleting the personal setting information of a specified user. When a user depresses 1303, the procedure proceeds to a user specification screen 1304.

A screen 1304 in FIG. 13B is the user specification screen. By selecting a user for whom the personal setting information is desired to be deleted, the personal setting information regarding that user can be deleted.

User information 1305 is information on each user. While user names and domain names are displayed here as examples, information such as last update date/time can also be displayed, and the content of display is not limited thereto.

Step S1202 is a step at which the user information deletion unit 308 instructs the extension program user information manager 310 to delete the personal setting information of a specified user.

Step S1203 is a step at which the extension program user information manager 310 deletes the personal setting information of the specified user from the personal setting information held in the extension program user information holder 311.

Step S1204 is a step at which the extension program user information holder 311 deletes the personal setting information of the specified user. If the personal setting information of the corresponding user is not present, nothing is performed here.

Step S1205 is a step at which the extension program user information manager 310 requests the embedded program user information manager 314 to delete the personal setting information within the embedded program user information holder 315.

Step S1206 is a step at which the embedded program user information manager 314 deletes the personal setting information of the specified user from the personal setting information within the embedded program user information holder 315.

Step S1207 is a step at which the embedded program user information holder 315 deletes the personal setting information. If the personal setting information of the corresponding user is not present, nothing is performed here.

In the above-described manner, a user can delete the personal setting information regarding the specified user without being aware of the storage location of the personal setting information. Although authority management is necessary for deletion of the personal setting information, the description of authority has been omitted here.

Embodiment 4

In the present embodiment, a description will be given of a case where synchronization with the external apparatus 105 is performed such that the information handled by a third party extension program 303 is distinguished from the information handled by a company's own extension program 303 as in Embodiment 1 in a service that manages the password and the like of an external server (not shown) among the personal setting information. The system configuration, hardware configuration, and software configuration of the present embodiment are the same as those of Embodiment 1, and therefore, the description thereof has been omitted.

FIG. 14 is a flowchart illustrating the flow used when the extension program 303 registers the password information. The present flowchart starts from a step at which the extension program 303 calls the external application user key manager 307, and ends with a step at which the embedded program user information holder 315 or the extension program user information holder 311 registers the password information.

Step S1401 is a step at which the extension program 303 calls the external application user key manager 307. In the extension program system service 304 that manages the password information, two types of key managers, namely, the external application user key manager 307 and the extension program user key manager 309, are present. Since the extension program user key manager 309 is not open to third parties, the third party extension program 303 manages the password information by calling the external application user key manager 307.

Step S1402 is a step at which the external application user key manager 307 calls the extension program user key manager 309.

Step S1403 is a step at which the extension program user key manager 309 detects a call from another program.

Step S1404 is a step at which the extension program user key manager 309 determines the caller program. If the caller is the external application user key manager 307, the procedure proceeds to step S1405, and otherwise, the procedure proceeds to step S1406.

Step S1405 is a step at which the extension program user key manager 309 sets a connection destination to the extension program user information manager 310.

Step S1406 is a step at which the extension program user key manager 309 sets a connection destination to the embedded program user information manager 314.

Step S1407 is a step at which the extension program 303 registers the password information.

Step S1408 is a step at which the extension program user key manager 309 determines the registration destination of the password information (key information). The registration destination is set at steps S1405 and S1406 described above. If the registration destination is the extension program user information manager 310, the procedure proceeds to step S1409, and if the registration destination is the embedded program user information manager 314, the procedure proceeds to step S1410.

Step S1409 is a step at which the extension program user information manager 310 registers the password information.

Step S1410 is a step at which the extension program user key manager 309 requests the embedded program user information manager 314 to register the password information.

Step S1411 is a step at which the extension program user information holder 311 registers the password information.

Step S1412 is a step at which the embedded program user information manager 314 registers the password information.

Step S1413 is a step at which the embedded program user information holder 315 registers the password information.

In the above-described manner, whether or not the caller of the extension program user key manager 309 is external application user key manager 307 can be determined in a service that manages the password and the like of an external server (not shown). This makes it possible to distinguish the personal setting information of a third party extension program 303 or a company's own extension program 303.

As a result, it is possible to perform cloud synchronization only for the personal setting information of the company's own extension program 303.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-025926, filed Feb. 13, 2014, which is hereby incorporated by reference herein in its entirety.

What is claimed is:

1. An image forming apparatus including a platform in which an application that accesses personal setting information can be installed, the image forming apparatus having been connected to an external apparatus which holds personal setting information, the image forming apparatus comprising:
   a first saving unit in which first personal setting information is saved;
   a second saving unit in which second personal setting information is saved; and
   a synchronization unit that synchronizes the first personal setting information and the second personal setting information with the personal setting information held by the external apparatus connected to the image forming apparatus.

2. The image forming apparatus according to claim 1, further comprising:
   a management unit that causes personal setting information used by an application (a) to be saved in the first saving unit as the first personal setting information, or (b) to be saved in the second saving unit as the second personal setting information, in accordance with authority of the application.

3. The image forming apparatus according to claim 2, wherein, when the application has predetermined authority, the first saving unit can be specified as a saving destination of the personal setting information used by the application.

4. The image forming apparatus according to claim 1, wherein the synchronization unit synchronizes the first personal setting information saved in the first saving unit with the personal setting information held by the external apparatus in response to a user login, and synchronizes the personal setting information held by the external apparatus with the first personal setting information saved in the first saving unit in response to a user logout.

5. The image forming apparatus according to claim 1, further comprising:
   a notification unit that notifies the application of start and end of synchronization performed by the synchronization unit,
   wherein the application restricts access to personal setting information used by the application in response to the notification of start of synchronization from the notification unit, and cancels the restriction of access to the personal setting information used by the application in response to the notification of end of synchronization from the notification unit.

6. The image forming apparatus according to claim 1, further comprising:
   a deletion unit that deletes, in response to an instruction to delete personal setting information used by the application, the first personal setting information saved in the first saving unit if the personal setting information used by the application is saved in the first saving unit, and deletes the second personal setting information saved in the second saving unit if the personal setting information used by the application is saved in the second saving unit.

7. The image forming apparatus according to claim 2, further comprising:
   a key management unit that receives an instruction to register key information used by an external application,
   wherein the management unit further receives an instruction to register the key information used by the application via or not via the key management unit, saves the key information in the second saving unit if the instruction to register the key information is received via the key management unit, and saves the key information in the first saving unit if the instruction to register the key information is received not via the key management unit.

8. A non-transitory computer-readable medium having recorded therein a program for, when loaded into a computer and executed, causing the computer to execute a process, the computer having been connected to an external apparatus which holds personal setting information, the process comprising:

saving first personal setting information in a first saving unit;

saving second personal setting information in a second saving unit; and synchronizing the first personal setting information and the second personal setting information with the personal setting information held by the external apparatus connected to the computer.

9. A control method of an image forming apparatus including a platform in which an application that accesses personal setting information can be installed, the image forming apparatus having been connected to an external apparatus which holds personal setting information, the control method comprising:

saving first personal setting information in a first saving unit;

saving second personal setting information in a second saving unit; and synchronizing the first personal setting information and the second personal setting information with the personal setting information held by the external apparatus connected to the image forming apparatus.

* * * * *